(12) United States Patent
Gray

(10) Patent No.: US 6,561,568 B1
(45) Date of Patent: May 13, 2003

(54) WINDOW SHIELD FOR VEHICLE BODY

(76) Inventor: Nigel John Gray, 61 Redland Drive, Kirkella, East Yorkshire HU10 7UX (GB)

( * ) Notice: Subject to any disclaimer, the term of this patent is extended or adjusted under 35 U.S.C. 154(b) by 0 days.

(21) Appl. No.: 09/914,325

(22) PCT Filed: Oct. 1, 1999

(86) PCT No.: PCT/GB99/03265

§ 371 (c)(1),
(2), (4) Date: Feb. 15, 2002

(87) PCT Pub. No.: WO00/21804

PCT Pub. Date: Apr. 20, 2000

(30) Foreign Application Priority Data

Oct. 14, 1998 (GB) .............................................. 9822384

(51) Int. Cl.$^7$ ................................................. B60J 1/20
(52) U.S. Cl. .................................... 296/152; 296/146.2
(58) Field of Search ............................... 296/152, 97.8, 296/96.14, 97.5, 146.15, 146.2, 155, 136; 52/202; 49/63; 160/105; 89/36.08

(56) References Cited

U.S. PATENT DOCUMENTS

| | | | | |
|---|---|---|---|---|
| 2,650,858 A | * | 9/1953 | Lange | 296/155 |
| 2,710,058 A | * | 6/1955 | Gronlund et al. | 160/103 |
| 2,780,458 A | * | 2/1957 | Thaxton | 49/63 |
| 3,025,098 A | * | 3/1962 | Andrews | 296/152 |
| 3,923,339 A | * | 12/1975 | McDonald | 296/95.1 |
| 4,056,280 A | * | 11/1977 | Bauer et al. | 296/146.6 |
| 4,306,378 A | * | 12/1981 | Fukura et al. | 49/352 |
| 4,331,359 A | * | 5/1982 | Sheldon | 296/146.2 |
| 4,403,450 A | * | 9/1983 | Ishii | 49/352 |
| 4,653,562 A | * | 3/1987 | Bannister | 160/135 |
| 4,707,018 A | * | 11/1987 | Gavagan | 296/152 |
| 4,763,454 A | * | 8/1988 | Brockhaus | 296/152 |
| 4,773,308 A | * | 9/1988 | Allen, Jr. | 454/131 |
| 4,773,697 A | * | 9/1988 | Svensson | 296/152 |
| 4,799,422 A | * | 1/1989 | Birt | 160/105 |
| 4,858,982 A | * | 8/1989 | Dykstra et al. | 296/97.8 |
| 5,192,110 A | * | 3/1993 | Mykytiuk et al. | 296/97.8 |
| 5,261,721 A | * | 11/1993 | Conger et al. | 296/146.15 |
| 5,370,035 A | * | 12/1994 | Madden, Jr. | 89/36.08 |
| 5,413,026 A | * | 5/1995 | Madden, Jr. | 89/36.08 |
| 5,524,694 A | * | 6/1996 | Arapis | 296/152 |
| 5,605,370 A | * | 2/1997 | Ruiz | 296/152 |
| 5,892,195 A | * | 4/1999 | Aufermann et al. | 218/157 |
| 6,347,825 B2 | * | 2/2002 | Seel et al. | 296/152 |
| 6,367,536 B1 | * | 4/2002 | St Louis | 160/352 |

FOREIGN PATENT DOCUMENTS

| | | |
|---|---|---|
| EP | 0958975 A1 | 11/1999 |
| GB | 2281091 | 2/1995 |

* cited by examiner

*Primary Examiner*—Kiran Patel
(74) *Attorney, Agent, or Firm*—Kohn & Associates, PLLC

(57) ABSTRACT

A secondary panel (12) is arranged such that it is in a non-operational position when the vehicle to which it is fitted is moving or operating normally, and may be moved into a security position adjacent window (11) when the vehicle is empty and locked to provide much greater resistance to unauthorized entry.

17 Claims, 1 Drawing Sheet

WINDOW SHIELD FOR VEHICLE BODY

CROSS REFERENCE TO RELATED APPLICATIONS

The present application is a National Phase Concerning a Filing Under 35 U.S.C. 371, claiming the benefit of priority of PCT/GB99/03265, filed Oct. 1, 1999, which claims the benefit of priority of Great Britain Application No. 9822384.5, filed Oct. 14, 1998, both of which are incorporated herein by reference.

BACKGROUND OF THE INVENTION

1. Field of the Invention

The invention relates to vehicle security. Car theft and theft of vehicle contents is virtually impossible to prevent if the thieves are determined, organized and properly equipped to commit the offense.

The invention relates to vehicle security. Car theft and theft of vehicle contents is virtually impossible to prevent if the thieves are determined, organised and properly equipped to commit the offence.

2. Description of Related Art

Statistics establish, however, that most thefts of vehicle contents, particularly radio equipment and the like, are an opportunist act. In the vast majority of cases, entry into the vehicle is gained via the side windows, which are the weak spot on all but very few vehicles. For reasons of safety, whilst front and rear windscreens are reinforced, for example, by laminations, the side windows are composed of more readily fracturable glass to enable ready access in case of an accident.

SUMMARY OF THE INVENTION

The invention provides a secondary panel arranged to be placed in a position adjacent to a vehicle window to resist unauthorized entry through the window.

U.S. Pat. No. 4,331,359 discloses a window shield positionable outside and adjacent a standard glass window of a vehicle.

According to a first aspect of the present invention there is provided a secondary panel arranged such that it may be moved from a non-operational position into a security position adjacent a window of a vehicle also having the door lock device, the secondary panel serving to resist unauthorised entry through the window, characterised in that the panel is provided with means to disengage a door lock device so that it cannot be operated until the secondary panel has been returned to the non-operational position.

The panel may comprise a secondary window.

Preferably there is a set of secondary panels (eg secondary windows), one for each side window of the vehicle to be protected.

Preferably the panel is arranged such that it can only come into the aforesaid security position when the vehicle is parked to increase the security of the parked vehicle.

It may only come into position when the vehicle is immobilised.

The panel may be fabricated from thin section robust material.

The material may comprise plastics, for example polycarbonate.

The material may comprise steel.

The material may comprise wire mesh.

The material may comprise reinforced glass.

A combination of materials may be used.

Preferably, the panel has an operating mechanism for placing it in position, which operating mechanism cannot operate when the vehicle is in motion.

The operating mechanism may be key operated and it may be such that it cannot be operated unless the vehicle is stationary and the ignition turned off.

The operating mechanism may be such that it will not operate if the vehicle is involved in an accident, for example by overturning.

The operating mechanism may be such that it can be operated externally as with central vehicle locking systems. It may be such that it will only operate if the vehicle is secure and unoccupied.

The panel may bear a clear printed message, internally and/or externally, to warn of the state of the vehicle.

The operating mechanism may be provided with override means, for example using a code message, allowing the panel to be brought into position should the driver be in a hostile environment. Thus the panel could, for example, be used by women driving at night.

The panel may be made of such a material that when it is in the non-operational position, it provides extra side protection for the vehicle against side impacts. A polycarbonate plastics panel could be particularly useful in this connection.

The door lock device may be disengaged by means of a latch strip.

Alternatively, the centre of a lock barrel may be attached to the secondary panel so that when the secondary panel is in the operating position the lock mechanism is totally disabled. In other words the key is rendered useless until the secondary panel has been returned to the non-operational position.

For example the lock barrel may be moved out of its normal position so that a key or an unauthorised implement such as a screw driver, cannot be inserted into the lock barrel when the secondary panel is in its operating position.

The invention includes a vehicle when fitted with at least one secondary panel according to the invention.

The secondary panel may be mounted internally or externally of the conventional window.

BRIEF DESCRIPTION OF THE DRAWINGS

By way of example, a specific embodiment of the invention will now be described, with reference to the accompanying drawings, in which.

DETAILED DESCRIPTION OF THE INVENTION

Figure 1:
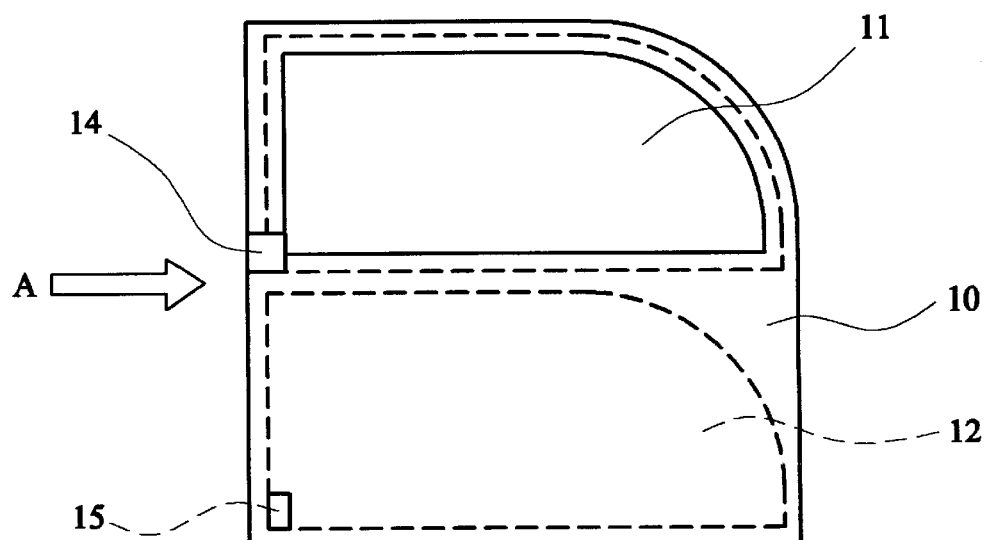
FIG. 1 is a side view of a vehicle door fitted with an embodiment of secondary panel according to the invention.
Figures 2, 3:
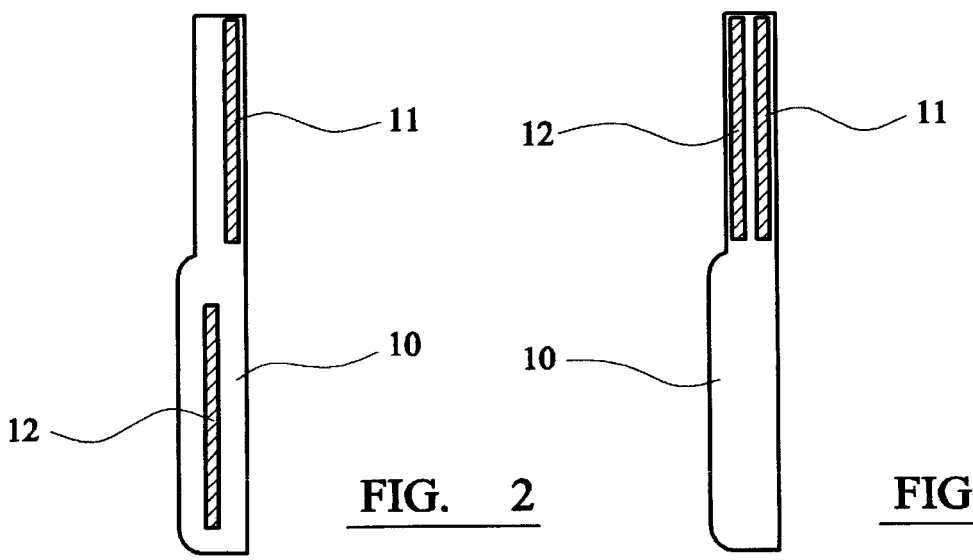
FIG. 2 is an edge view of the door showing the secondary panel in its non-operative position.
FIG. 3 is an edge view of the door showing the secondary panel in its operative position.

FIGS. 1, 2, and 3 show a car door having a conventional glazed window 11.

Housed in the lower part of the door is a secondary window 12 of reinforced glass.

When the vehicle is operating normally, the secondary window 12 remains in the position shown in FIG. 2 and, if necessary, the window 11 can be broken to gain access in the event of an emergency.

However when the car is empty and locked an electric window operating mechanism (not shown) comes into operation and the secondary window 12 rises to the position shown in FIG. 3, in which it provides much greater resistance to unauthorised entry.

Figure 4:
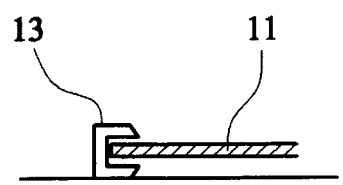
FIG. 4 is a plan view of one edge of a prior art door.

FIG. 4 shows a conventional arrangement in which a single conventional window 11 fits into a glazing bead 13.

Figure 5:
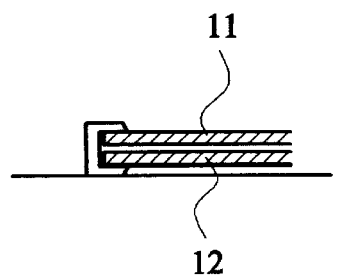
FIG. 5 is a plan view of part of the edge of the door according to the invention.

FIG. 5 illustrates how the window 11 can receive along side it the secondary window 12.

While only one car door has been shown, it will be appreciated that a secondary window will normally be provided for each side window of the vehicle.

While the invention has been specifically developed for use with cars, it can of course be used with any vehicle having side windows which are susceptible to unauthorised entry.

What is claimed is:

1. A secondary panel (12) arranged such that it may be moved from a non-operational position into a security position adjacent to a window (11) of a vehicle and also having a door lock device, the secondary panel serving to resist unauthorized entry through the window, characterized in that the panel is provided with means to disengage the door lock device so that the door lock device cannot be operated until the secondary panel has been returned to the non-operational position.

2. A panel according to claim 1 and comprising a secondary window (12).

3. A panel according to claim 1 and arranged such that it can only come into the security position when the vehicle is parked.

4. A panel according to claim 1 and arranged such that it can only come into the security position when the vehicle is immobilized.

5. A panel according to claim 1 and including an operating mechanism for placing it in the security position, which operating mechanism cannot operate when the vehicle is in motion.

6. A panel according to claim 5, wherein the operating mechanism is key operated and cannot be operated unless the vehicle is stationary and the ignition turned off.

7. A panel according to claim 5, wherein the operating mechanism will not operate if the vehicle is involved in an accident.

8. A panel according to claim 5, wherein the operating mechanism can be operated externally.

9. A panel according to claim 1 and bearing a clear printed message, internally and/or externally, to warn of the state of the vehicle.

10. A panel according to claim 5 wherein the operating mechanism is provided with override means, for example using a code message, allowing the panel to be brought into position should the driver be in a hostile environment.

11. A panel according to claim 1 and being made of such a material that is provides extra side protection for the vehicle against side impacts.

12. A panel according to claim 1, wherein the door lock device is disengaged by means of a latch strip.

13. A panel according to claim 1, wherein the center of a lock barrel is attached to the secondary panel so that when the secondary panel is in the operating position, the lock mechanism is totally disabled.

14. A panel according to claim 1 for mounting either internally or externally of the window.

15. A panel according to claim 1 and fabricated from thin section robust material.

16. A set of secondary panels according to claim 1 one for each side window of the vehicle to be protected.

17. A vehicle fitted with at least one secondary panel according to claim 1.

* * * * *